(12) United States Patent
Malik et al.

(10) Patent No.: US 7,908,505 B2
(45) Date of Patent: Mar. 15, 2011

(54) APPARATUS, SYSTEM, AND METHOD FOR EVENT, TIME, AND FAILURE STATE RECORDING MECHANISM IN A POWER SUPPLY

(75) Inventors: Randhir S. Malik, Cary, NC (US); Cecil C. Dishman, Raleigh, NC (US); Ted A. Howard, Cary, NC (US); Eino A. Lindfors, Raleigh, NC (US); Trung M. Nguyen, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 754 days.

(21) Appl. No.: 11/864,613

(22) Filed: Sep. 28, 2007

(65) Prior Publication Data

US 2009/0089604 A1   Apr. 2, 2009

(51) Int. Cl.
*G06F 1/30* (2006.01)

(52) U.S. Cl. .......... 713/340; 713/300; 713/330; 714/47; 714/48

(58) Field of Classification Search ............ 713/330, 713/340; 714/47, 48
See application file for complete search history.

(56) References Cited

U.S. PATENT DOCUMENTS

| | | | | |
|---|---|---|---|---|
| 5,237,699 A * | 8/1993 | Little et al. | .......... | 714/23 |
| 5,481,730 A * | 1/1996 | Brown et al. | .......... | 713/340 |
| 6,035,368 A * | 3/2000 | Habib | .......... | 711/103 |
| 6,115,822 A | 9/2000 | Kim et al. | .......... | 713/310 |
| 6,425,086 B1 * | 7/2002 | Clark et al. | .......... | 713/322 |
| 6,459,997 B1 * | 10/2002 | Andersen | .......... | 702/57 |
| 6,536,671 B1 * | 3/2003 | Baentsch | .......... | 235/487 |
| 6,629,248 B1 | 9/2003 | Stachura et al. | .......... | 713/340 |
| 6,990,603 B2 | 1/2006 | Strasser | .......... | 714/6 |
| 7,028,197 B2 * | 4/2006 | Subramanian et al. | ....... | 713/310 |
| 7,206,950 B2 * | 4/2007 | Tanaka et al. | .......... | 713/322 |
| 7,223,964 B2 * | 5/2007 | Wiese et al. | .......... | 250/239 |
| 7,493,525 B2 * | 2/2009 | Wigley et al. | .......... | 714/45 |
| 7,509,537 B1 * | 3/2009 | Jensen et al. | .......... | 714/47 |
| 7,571,342 B2 * | 8/2009 | Tanaka et al. | .......... | 713/600 |
| 7,581,137 B2 * | 8/2009 | Okada et al. | .......... | 714/24 |
| 7,675,320 B2 * | 3/2010 | Speers et al. | .......... | 326/39 |
| 7,724,604 B2 * | 5/2010 | Amidi et al. | .......... | 365/229 |
| 2002/0095610 A1 * | 7/2002 | Nunomura | .......... | 713/322 |
| 2003/0120357 A1 * | 6/2003 | Battistutto et al. | .......... | 700/11 |
| 2003/0126494 A1 | 7/2003 | Strasser | .......... | 714/6 |

(Continued)

FOREIGN PATENT DOCUMENTS

WO    WO 02/101554    5/2002

*Primary Examiner* — Chun Cao
*Assistant Examiner* — Zahid Choudhury
(74) *Attorney, Agent, or Firm* — Kunzler Needham Massey & Thorpe

(57) ABSTRACT

An apparatus, system, and method are disclosed for event, time, and failure state recording in a power supply. Disclosed is a power supply that receives AC voltage as an input and provides regulated DC voltage as an output; a microcontroller integrated into the power supply that regulates output voltage and monitors, records, and reports operating conditions of the power supply; and a non-volatile solid-state storage that can be repeatedly read from, written to, and erased by the microcontroller and integrated within the microcontroller such that only a single address is needed to access both the microcontroller and the solid-state storage, the solid-state storage configured to store operating data received from the microcontroller, the operating data including the recorded operating conditions of the power supply.

25 Claims, 12 Drawing Sheets

U.S. PATENT DOCUMENTS

| | | |
|---|---|---|
| 2004/0215982 A1* | 10/2004 | Subramanian et al. ....... 713/300 |
| 2004/0267989 A1* | 12/2004 | Leung et al. .................. 710/100 |
| 2005/0034002 A1* | 2/2005 | Flautner ........................ 713/322 |
| 2005/0245793 A1* | 11/2005 | Hilton et al. .................. 600/300 |
| 2007/0067675 A1* | 3/2007 | Wigley et al. ................... 714/20 |
| 2007/0260918 A1* | 11/2007 | Okada et al. .................... 714/14 |
| 2008/0025126 A1* | 1/2008 | Jewell et al. ................... 365/228 |
| 2008/0270711 A1* | 10/2008 | Kwon et al. ................... 711/148 |

* cited by examiner

APPARATUS, SYSTEM, AND METHOD FOR EVENT, TIME, AND FAILURE STATE RECORDING MECHANISM IN A POWER SUPPLY

BACKGROUND OF THE INVENTION

1. Field of the Invention

This invention relates to power supplies, and more particularly relates to the recording of power supply faults and recording data describing the operating conditions during which a power supply fault occurs.

2. Description of the Related Art

A power supply, sometimes know as a power supply unit or PSU, is a device or system that supplies electrical or other types of energy to an output load or group of loads. A power supply, in some embodiments may be configured to convert power in one form to another form, such as converting AC power to DC power. The regulation of power supplies is typically done by incorporating circuitry to tightly control the output voltage and/or current of the power supply to a specific value. The specific value is closely maintained despite variations in the load presented to the power supply's output, or any reasonable voltage variation at the power supply's input.

In a computer, the power supply is typically designed to convert an AC voltage input such as is traditionally provided by a conventional wall socket, into several low-voltage DC power outputs for transmission to the internal components of the computer. Conversion is typically performed in stages that may include various stages such as a rectification stage, a boost or buck stage, and a regulator/chopper stage. Conventional power supplies, implement very little if any monitoring and data storage capabilities within the power supply which can make it difficult to diagnose an error or fault in the power supply without some additional information from an external system or memory.

This can be a problem because when a power supply fails while being used in the field, the power supply is often returned to the manufacturer for diagnosis. However, a large percentage of returned power supplies result in a no defect found "(NDF)" meaning that the manufacturer was unable to find a defect in the power supply. The cost for diagnosing power supplies believed to be faulty, but which are actually not faulty, can be extremely expensive.

Furthermore, there is no record of failure codes, hours of operation, power ON/OFF cycles, the event and the time of occurrence of a power fault, and there is no conventional mechanism to determine the power consumption data in real time which can be crucial to determining the environmental conditions of the power supply at the time of a failure. In existing solutions, only the fault codes are reported to the system powered by the power supply, and such information is not recorded within the power supply itself. Thus, when a power supply is returned to the manufacturer, there is no actual record of the faults saved, nor the operations being performed when the fault occurred, nor the POWER-ON Hours "(POH)" that the power supply was in use. In rare embodiments in which a power supply does store recorded operation data in the power supply, such operation is limited to POH data that is stored in a memory outside of power supply's microcontroller which means that two addresses are needed to communicate with the microcontroller and the memory. Furthermore, such an implementation can be extremely expensive and may require very complex circuitry.

Thus, there is a need for a power supply that includes an inexpensive memory integrated within a power supply microcontroller for monitoring, recording, and reporting the operating conditions of the power supply, and particularly recording the operating conditions of a power supply at the time of and immediately preceding a failure.

SUMMARY OF THE INVENTION

From the foregoing discussion, it should be apparent that a need exists for an apparatus, system, and method that integrates a memory within a power supply microcontroller to monitor, record, and report operating conditions of a power supply. Beneficially, such an apparatus, system, and method would reduce the cost of diagnosing a failed power supply and allow a power supply provide operational data for analysis even in the absence of the system to which it was connected.

The present invention has been developed in response to the present state of the art, and in particular, in response to the problems and needs in the art that have not yet been fully solved by currently available power supplies.

The apparatus includes a power supply that receives AC voltage as an input and provides regulated DC voltage as an output; a microcontroller integrated into the power supply that regulates output voltage and monitors, records, and reports operating conditions of the power supply; and a non-volatile solid-state storage that can be repeatedly read from, written to, and erased by the microcontroller and integrated within the microcontroller such that only a single address is needed to access both the microcontroller and the solid-state storage, the solid-state storage configured to store operating data received from the microcontroller, the operating data comprising recorded operating conditions of the power supply. In one embodiment, the non-volatile solid-state storage is an electrically erasable programmable read-only memory "(EEPROM)", and in a further embodiment, the EEPROM is a flash memory.

The apparatus is provided with a plurality of modules configured to: periodically determine and store, in the solid state-storage, efficiency data for the power supply, the efficiency data comprising data indicating an amount of power loss within the power supply; periodically determine and store, in the solid state-storage, energy consumption data for the power supply, the energy consumption data comprising data indicating an amount of energy consumed by the power supply; determine and store, in the solid state-storage, a time stamp indicating a time and a date at which a power fault occurred, the time and data information received from a system clock external to the power supply; determine and store, in the solid state-storage, a number of hours during which the power supply has been operating; determine and store, in the solid state-storage, each date and time that the power supply is turned on and each date and time that the power supply is turned off; determine and store, in the solid state-storage, a temperature of at least one critical component of the power supply and a fan speed of a fan configured to cool the component; to output a failure prediction warning in response to detection of a temperature above a predefined threshold and a fan speed below a predefined threshold; measure a voltage on one or more critical components, compare the voltage against a voltage threshold in a voltage stress lookup table, and output a warning in response to the voltage exceeding the voltage threshold from the voltage stress lookup table; continuously record and update, in the solid state-storage, a predetermined number of cycles of a voltage waveform for one or more MOSFETs in the power supply, a cycle comprising one period of a switching rate for the power supply; autonomically adjust a bulk voltage of the power supply in response to a peak AC input voltage exceeding a predetermined threshold, the bulk voltage comprising an output of a first power supply stage and used as an input of a second power supply stage In further embodiments, the efficiency module is further configured to compare the efficiency data stored in the solid-state storage with a lookup efficiency table and output a prediction failure warning in response to the power supply efficiency falling below a predefined threshold, and the bulk voltage module may be further configured to adjust a setpoint of the first power supply stage, the setpoint comprising a voltage to which the first power supply stage regulates the bulk voltage.

In one embodiment of the waveform module, the recorded and updated voltage waveforms comprise a predetermined number of voltage waveforms immediately preceding a failure event.

A system and method of the present invention are also presented. The system and method in the disclosed embodiments substantially include the steps necessary to carry out the functions presented above with respect to the operation of the described apparatus. The system, in one embodiment, includes an electronic device that receives regulated DC voltage as an input from the power supply.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
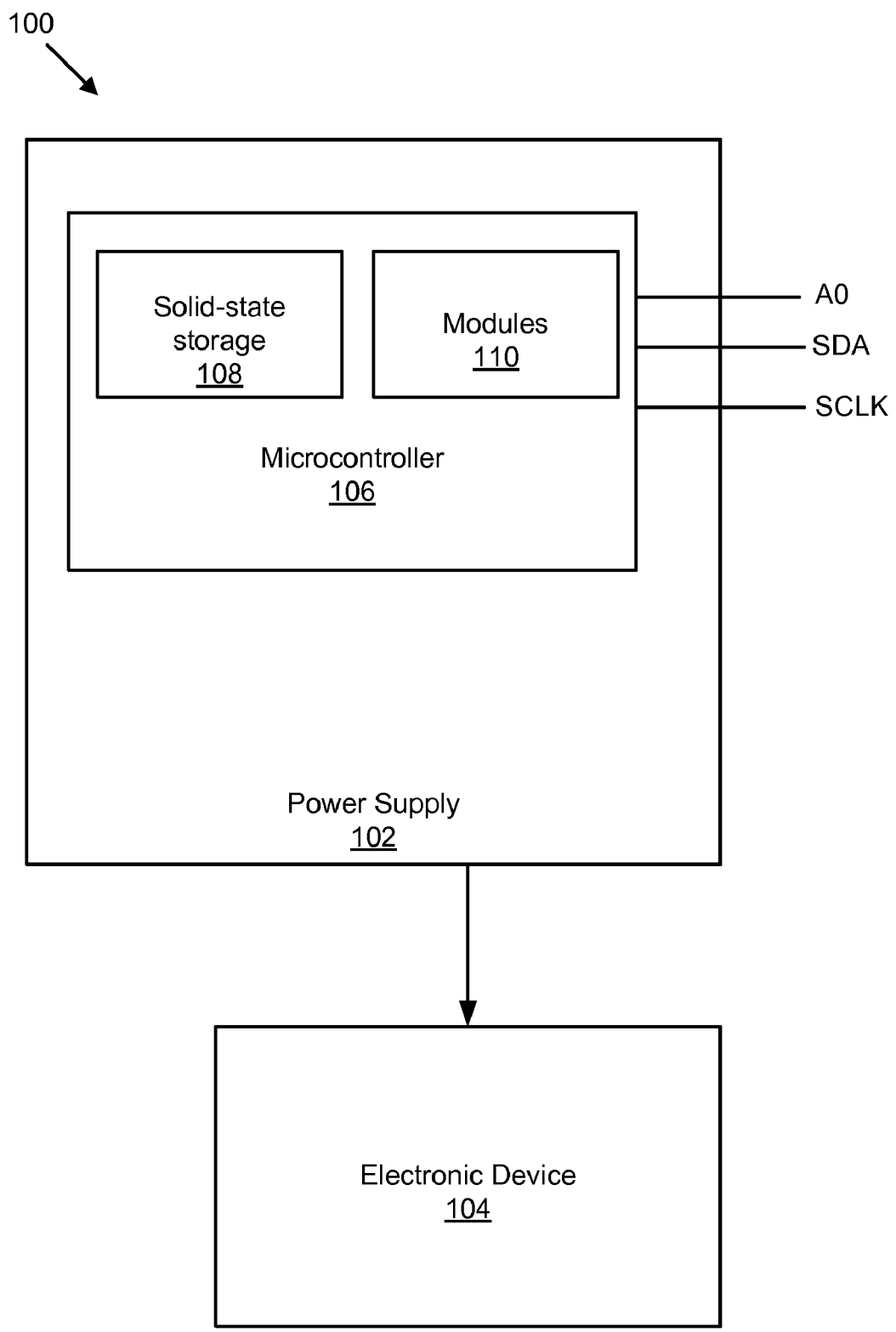
FIG. 1 is a schematic block diagram illustrating one embodiment of a system comprising a power supply with an integrated solid-state storage in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

FIG. 1 is a schematic block diagram illustrating one embodiment of a system 100 in accordance with the present invention. The system 100 includes a power supply 102 that receives AC voltage as input and provides regulated DC voltage as an output to an electronic device 104. In one embodiment, the power supply 102 is exterior to the electronic device 104. In another embodiment, the power supply 102 is interior to or integrated with the electronic device 104. The power supply includes a microcontroller 106 integrated into the power supply 102 that regulates the output voltage and monitors, records, and reports operating conditions of the power supply 102. The Microcontroller 106 includes a non-volatile solid-state storage 108 that can be repeatedly read from, written to, and erased by the microcontroller 106 and integrated within the microcontroller such that only a single address is needed to access both the microcontroller and the solid-state storage 108. The microcontroller 106 also includes one or more modules 110 configured to perform the logic necessary to monitor, record, and report the operating conditions of the power supply 102.

In one embodiment, the power supply 102 is configured to convert AC power from a conventional 110 V or 220 V wall socket into one or more low-voltage DC power outputs to provide power the components of the electrical device 104. In various embodiments, the electrical device 104 may comprise a personal computer, laptop, server, personal digital assistant ("PDA"), household appliance, electronic toy or gaming device, or various other electrical devices that utilize a power supply as will be recognized by one of skill in the art. The power supply 102 may include various stages for transforming and converting the incoming AC power into usable DC power, or vice-versa. The stages may include a rectifier stage for converting AC power to DC power, a regulator stage for maintaining a constant voltage level, an inverter stage for converting DC power back to AC power, a boost stage for outputting a DC voltage greater than an input DC voltage, a buck stage for outputting a DC voltage lower than an input DC voltage, or various other power supply stages as will be recognized by those of skill in the art.

The microcontroller 106, in one embodiment, is a single integrated circuit with a central processing unit ("CPU"), input/output interfaces such as serial ports ("UARTs"), ram for non-persistent data storage, and a non-volatile solid-state storage 108 such as flash memory or an electrically erasable programmable read-only memory ("EEPROM"). The microcontroller 106 includes at least one address A0 through which the microcontroller 106 and the solid-state storage 108 are accessed by other components such as the electronic device 104 or by some other external or internal system component. Because the solid-state storage 108 is integrated (embedded) within the microcontroller 106, an additional address for accessing the solid-state storage 108 is not needed, and the microcontroller 106 and solid-state storage 108 can be accessed by a single address. Such a configuration allows the avoidance of a communication conflict between the system controller and the microcontroller 106 and allows the microcontroller 106 to operate continuously without pausing while the system accesses a separate address should the solid-state storage 108 be located outside of the microcontroller 106.

Furthermore, by utilizing a persistent solid-state storage 108 that can be written to, read from, and erased many times, the microcontroller is able to quickly and efficiently store a large amount of data concerning the operation of the power supply 102 which can be used later for diagnosing a fault in the power supply 102. For example, if the power supply 102 experiences a fault, error, or failure in the field, the power supply 102 will likely be returned the manufacturer for diagnosis. Usually, the power supply 102 is returned without the system or electronic device 104 to which it was providing power. In the present invention, operating data describing the operating conditions at the time of failure is stored within the power supply 102 so the failure can be diagnosed more quickly and, in some cases, without even opening the power supply's case. In some embodiments, the operating data may be utilized in real time to predict an imminent failure of the power supply.

Figure 2:
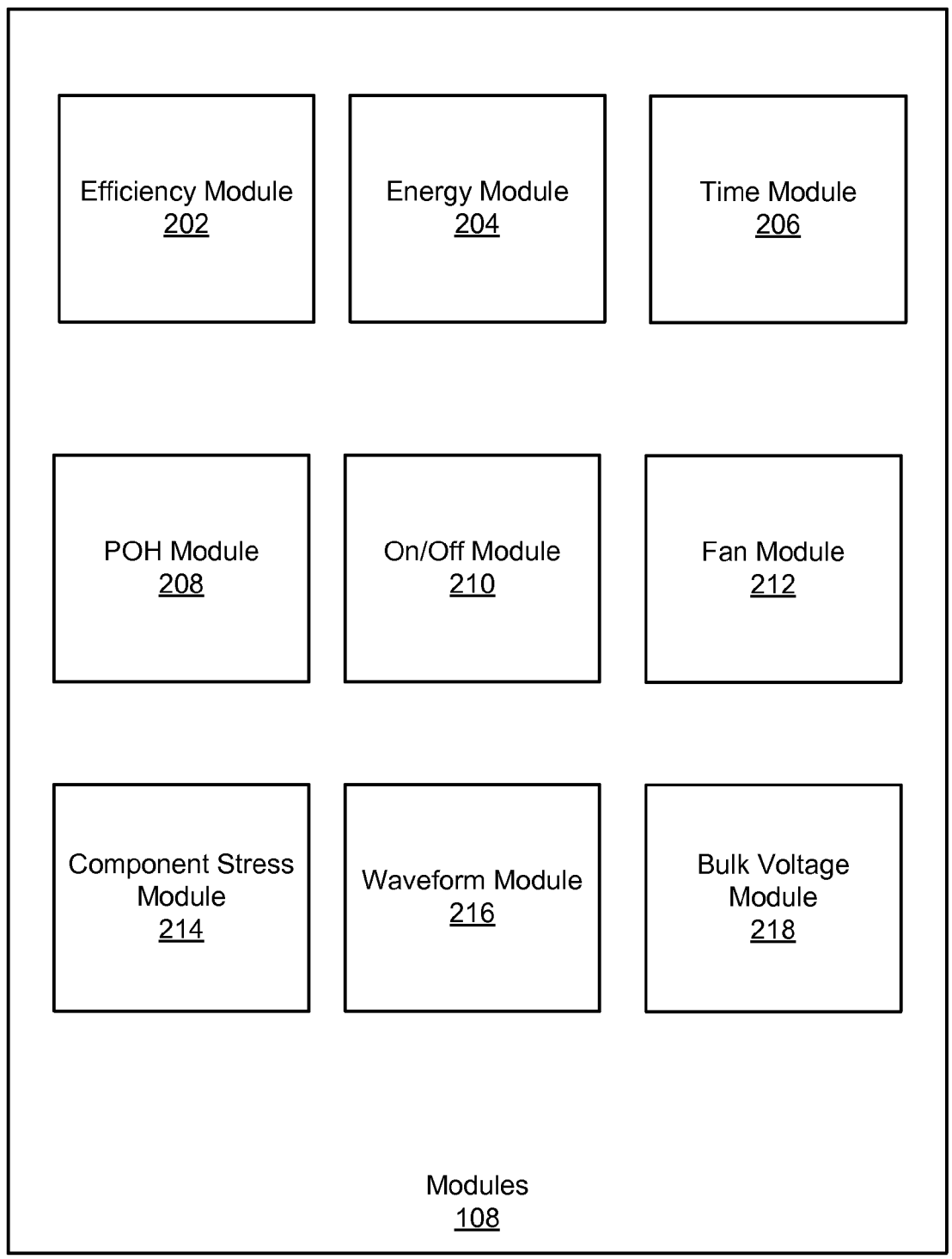
FIG. 2 is a schematic block diagram illustrating one embodiment of a plurality of modules for monitoring, storing, and reporting operating conditions of a power supply.

FIG. 2 is a schematic block diagram illustrating one embodiment of a plurality of modules 110 for monitoring, storing, and reporting operating conditions of the power supply 102. The modules 110 in various embodiments may include an efficiency module 202, an energy module 204, a time module 206, a power on hours "(POH)" module 208, an on/off module 210, a fan module 212, a component stress module 214, a waveform module 216, and a bulk voltage module 218, which are described below.

Generally the modules 110 are configured to record information about a fault event and retain the information in the solid-state storage 108 which is preferably a flash memory. In various embodiments, the modules may save in the solid-state storage 108 data such as the power on hours (number of hours the power supply has been on), the number of on/off cycles, the date of manufacture, fault codes, the time and date of a fault, the operation being performed at the time of a fault, the current drawn by the system, the input power from the AC line per hour, etc. Such information may help a manufacturer determine whether a power supply 102 fault was caused by the power supply 102 or some other system condition or may be used to predict an imminent failure and issue a warning to an external system.

Figure 3:
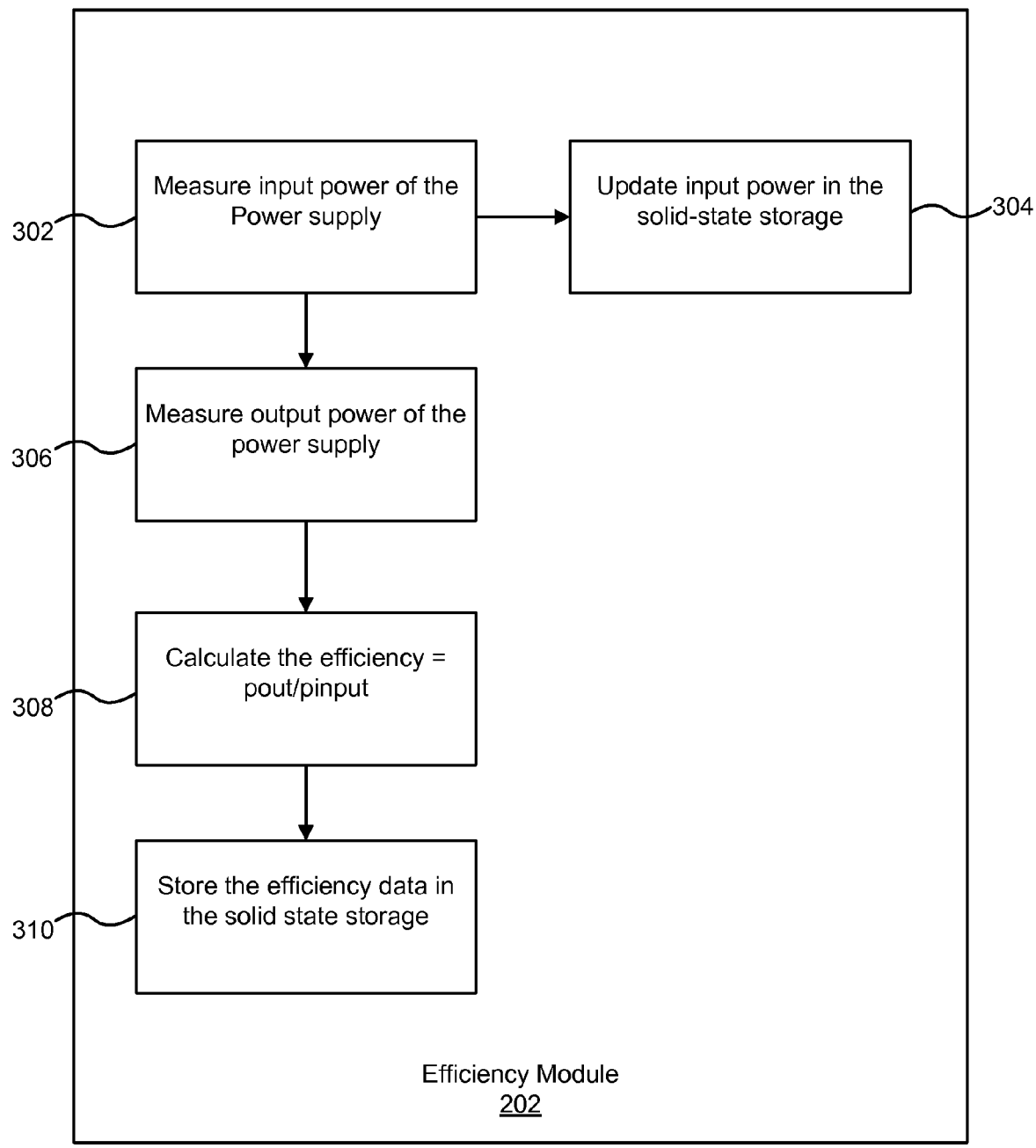
FIG. 3 is a schematic flow chart diagram illustrating one embodiment of an efficiency module to periodically determine and store, in the solid state-storage, efficiency data for the power supply, the efficiency data comprising data indicating an amount of power loss within the power supply.

FIG. 3 is a schematic flow chart diagram illustrating one embodiment of an efficiency module 202 to periodically determine and store, in the solid state-storage 108, efficiency data for the power supply 102 where the efficiency data includes data indicating an amount of power loss within the power supply. In order determine the efficiency data, the efficiency module 202 measures 302 the input power of the power supply 102. The efficiency module 202 stores 304 the input power data in the solid-state storage 108. Then, the efficiency module 202 measures 306 the output power of the power supply 102.

To calculate the efficiency of the power supply 102, the efficiency module 202, in one embodiment, calculates the ratio of output power "pout" over the input power "pin" such that pout/pin=efficiency. The efficiency module 202 then stores 310 the efficiency data in the solid state storage 108. In one embodiment, the efficiency data may be utilized to form a lookup table for comparing against future efficiency calculations such that a degradation of efficiency can be detected. As will be recognized by one of skill in the art, other types of efficiency calculations may be utilized in accordance with the present invention such using a difference between pin and pout instead of a ratio.

In one embodiment, the efficiency module 202 is further configured to compare the efficiency data with efficiency data predefined in a look up table to determine if the power supply 102 is operating efficiently. In at least one embodiment, the efficiency module 202 may output a prediction failure warning in response to the power supply efficiency falling below a predefined threshold. For example, the predefined threshold might require the power supply 102 to operate at 80% efficiency at a particular power level or within a particular power range (e.g. 70-100% of rated capacity). A warning may be issued if the power supply 102 begins operating at below the 80% efficiency threshold while at a particular power level within the predetermined power range such as by operating at 75% efficiency at 80% capacity.

Figure 4:
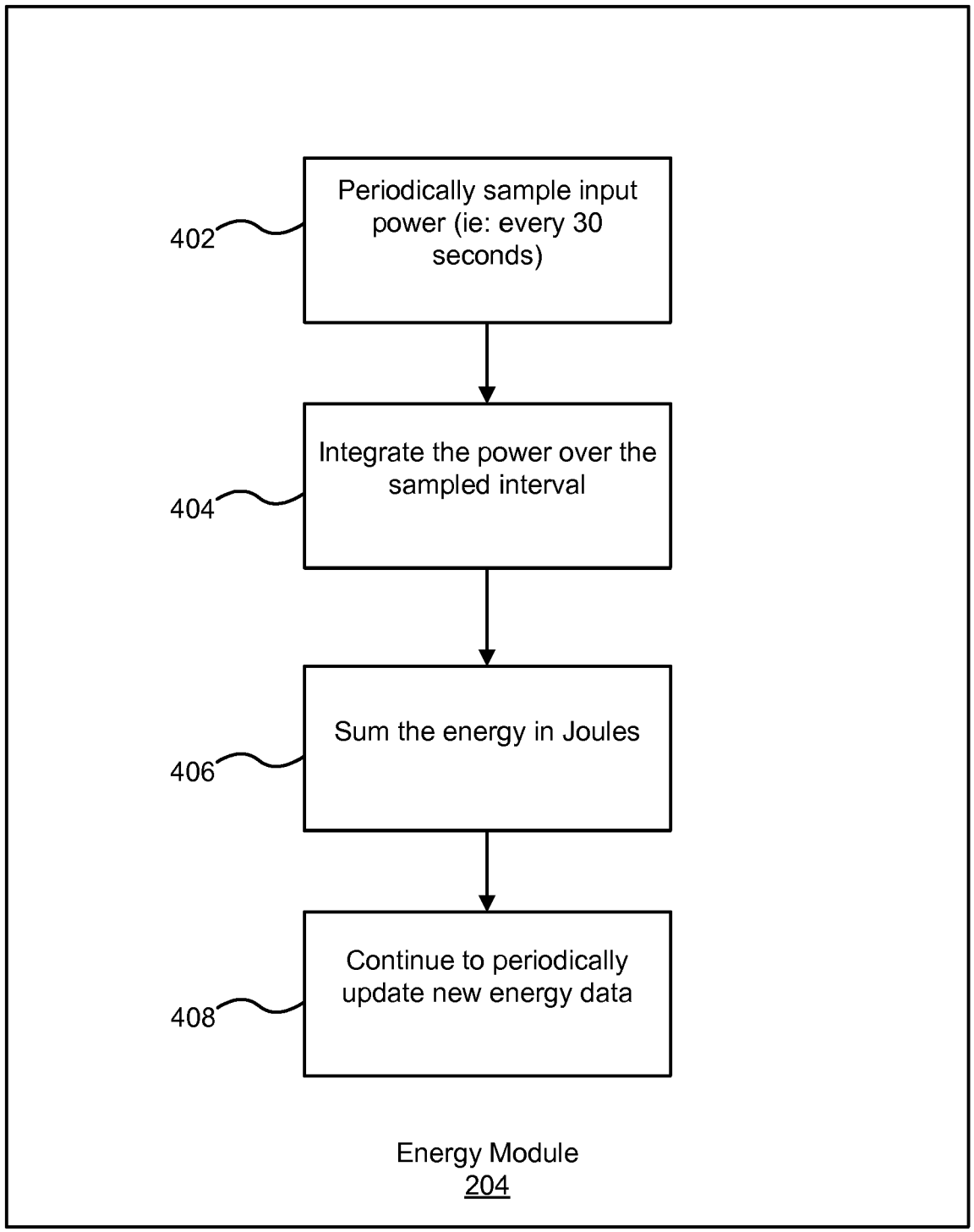
FIG. 4 is a schematic flow chart diagram illustrating one embodiment of an energy module to periodically determine and store, in the solid state-storage, energy consumption data for the power supply, the energy consumption data comprising data indicating an amount of energy consumed by the power supply.

FIG. 4 is a schematic flow chart diagram illustrating one embodiment of an energy module 204 to periodically determine and store, in the solid state-storage 108, energy consumption data for the power supply 102. The energy consumption data includes data indicating an amount of energy consumed by the power supply 102. To determine the energy consumed by the power supply 102, the energy module 204 periodically samples 402 the input power to the power supply 102.

For example, in one embodiment, the energy module 204 may sample the input power once every 30 seconds or in another embodiment it may sample the input power once every 10 seconds. In the embodiment, the energy module 204 integrates 304 the input power over the sampled interval to calculate the amount of energy consumed during the interval. The energy module 204 then sums 306 the calculated energy in Joules to determine the total amount of energy consumed by the power supply 102. The energy module 204 continues to periodically update 308 new energy data and store the data in the solid-state storage 108. In other embodiments, the energy module 204 may use other methods to measure energy used by the power supply. The stored energy consumption data may used to determine if the power supply 102 is consuming too much power or to correlate failures with energy consumption to characterize age-related failures. One of skill in the art will recognize other ways that the energy module 204 may calculate and store energy consumed by the power supply 102 and other ways to use the energy consumption data.

Figure 5:
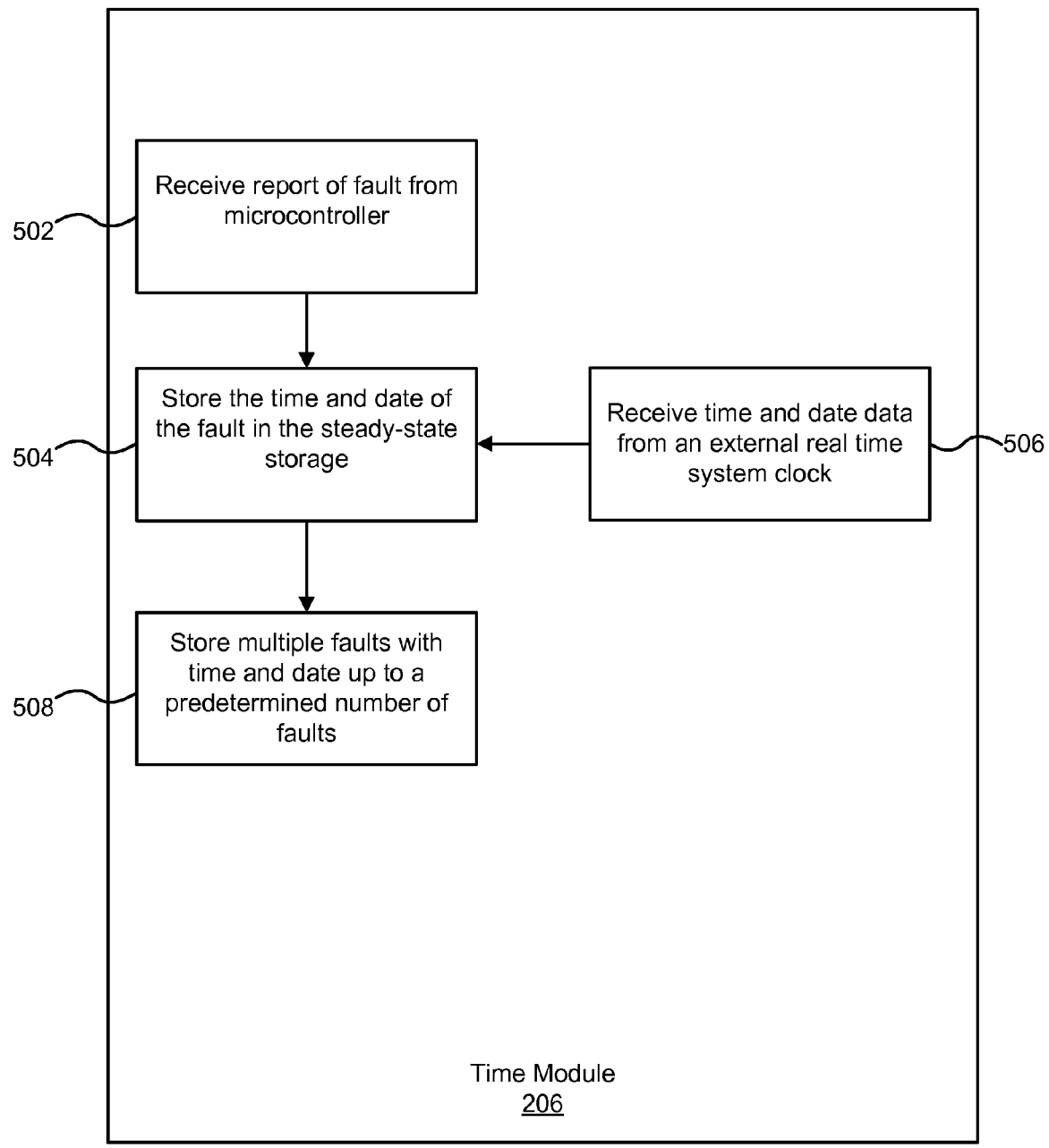
FIG. 5 is a schematic flow chart diagram illustrating one embodiment of a time module to determine and store, in the solid state-storage, a time stamp indicating a time and a date at which a power fault occurred, the time and data information received from a system clock external to the power supply.

FIG. 5 is a schematic flow chart diagram illustrating one embodiment of a time module 206 to determine and store, in the solid state-storage, a time stamp indicating a time and a date at which a power fault occurred. The time and data information is received from a system clock external to the power supply 102.

In one embodiment, the time module 206 receives 502 a report from the microcontroller 106 of a fault, error, or failure affecting the operation power supply 102. The time module 206 stores 504 the time and date, or time stamp, when the fault occurred in the steady-state storage 108. The time and data information is preferably received 506 from an external real time system clock to maintain a power supply clock that is more accurate than power supplies that don't receive clock synchronization information. In various embodiments, multiple faults may have associated time and date information stored 508 in the solid-state storage 108 up to a predetermined number of faults. For example, the time module 206 may keep time and date information stored about last 40 faults in the solid-state storage 108, or in another embodiment, the time module 206 may keep information about the entire history of faults within the storage limits of the solid-state storage 108.

In a further embodiment, the time module 206 may include storing additional information about the faults such as fault codes or error codes. The time module 206 may keep a record of predetermined number of faults, and once that predetermined number is reached, the time module 206 may continuously update the record of faults such that the previous, for example 40, faults are always stored in the solid-state storage 108. The time and date and fault information may be utilized to determine what operations were being performed at the time of a failure to help determine the cause of the failure.

Figure 6:
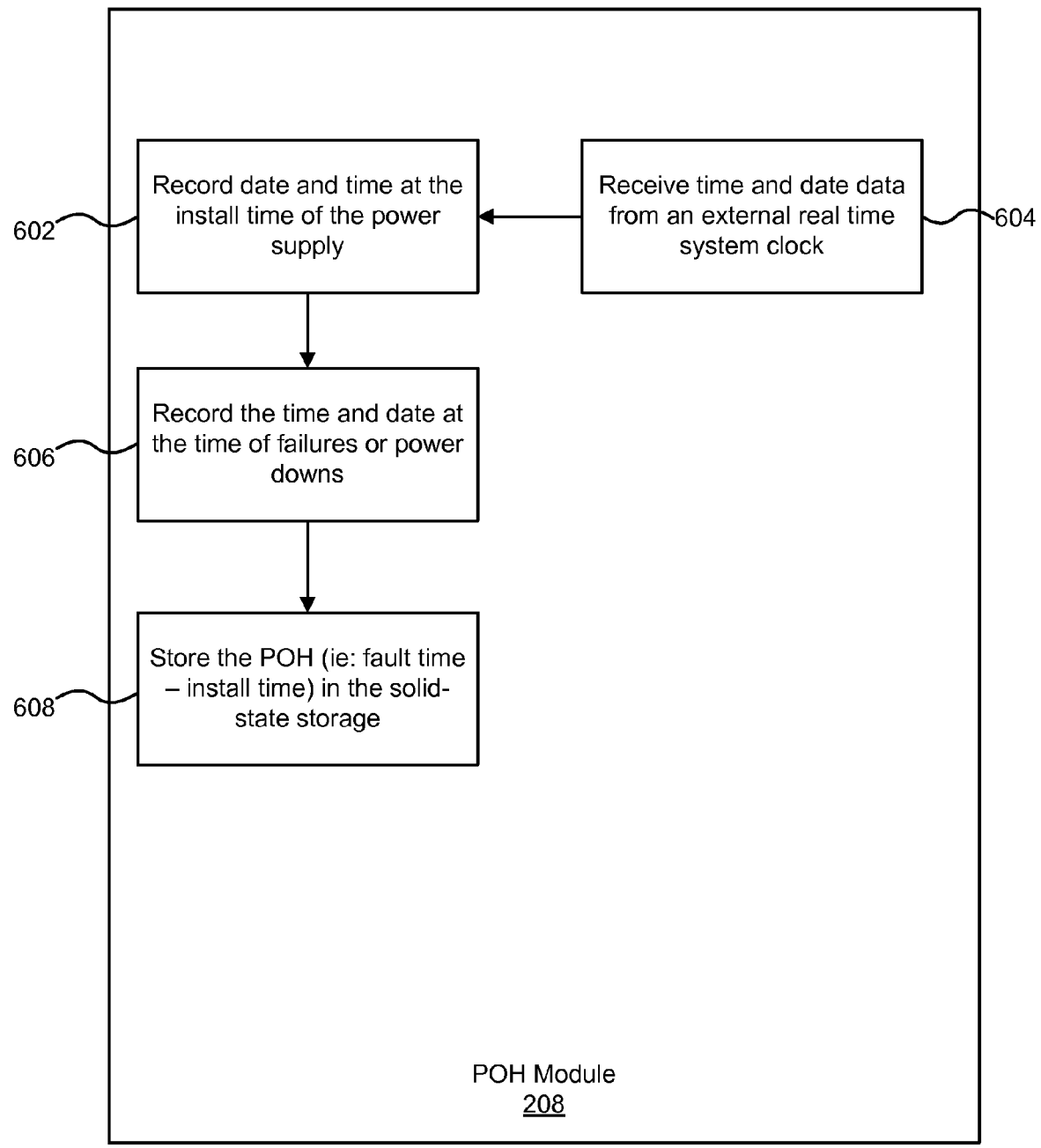
FIG. 6 is a schematic flow chart diagram illustrating one embodiment of a power-on hours "(POH)" module to determine and store, in the solid state-storage, a number of hours during which the power supply has been operating.

FIG. 6 is a schematic flow chart diagram illustrating one embodiment of a power-on hours ("POH") module 208 configured to determine and store, in the solid state-storage 108, a number of hours during which the power supply 102 has been operating.

The POH module 208, in one embodiment, records 602 the date and time at the install, or first use, of the power supply 102. The install time typically indicates the time at which the power supply 102 was first put into operation. The POH module 208 preferably receives the time and date data from an external real time system clock. The time and date information is typically recorded 606 each time a failure or power down of the power supply 102 occurs. Or in other words, any time the power supply 102 begins or ends operation, a time and date is recorded 606 such that the total time of operation of the power supply 102 may be calculated. The POH module 208 stores 608 the time and date information in the solid-state storage 108 for later use. The POH time and date information indicates the amount of time the power supply 102 has been in operation and may be used by a manufacturer, for example, to determine if a warranty has expired.

Figure 7:
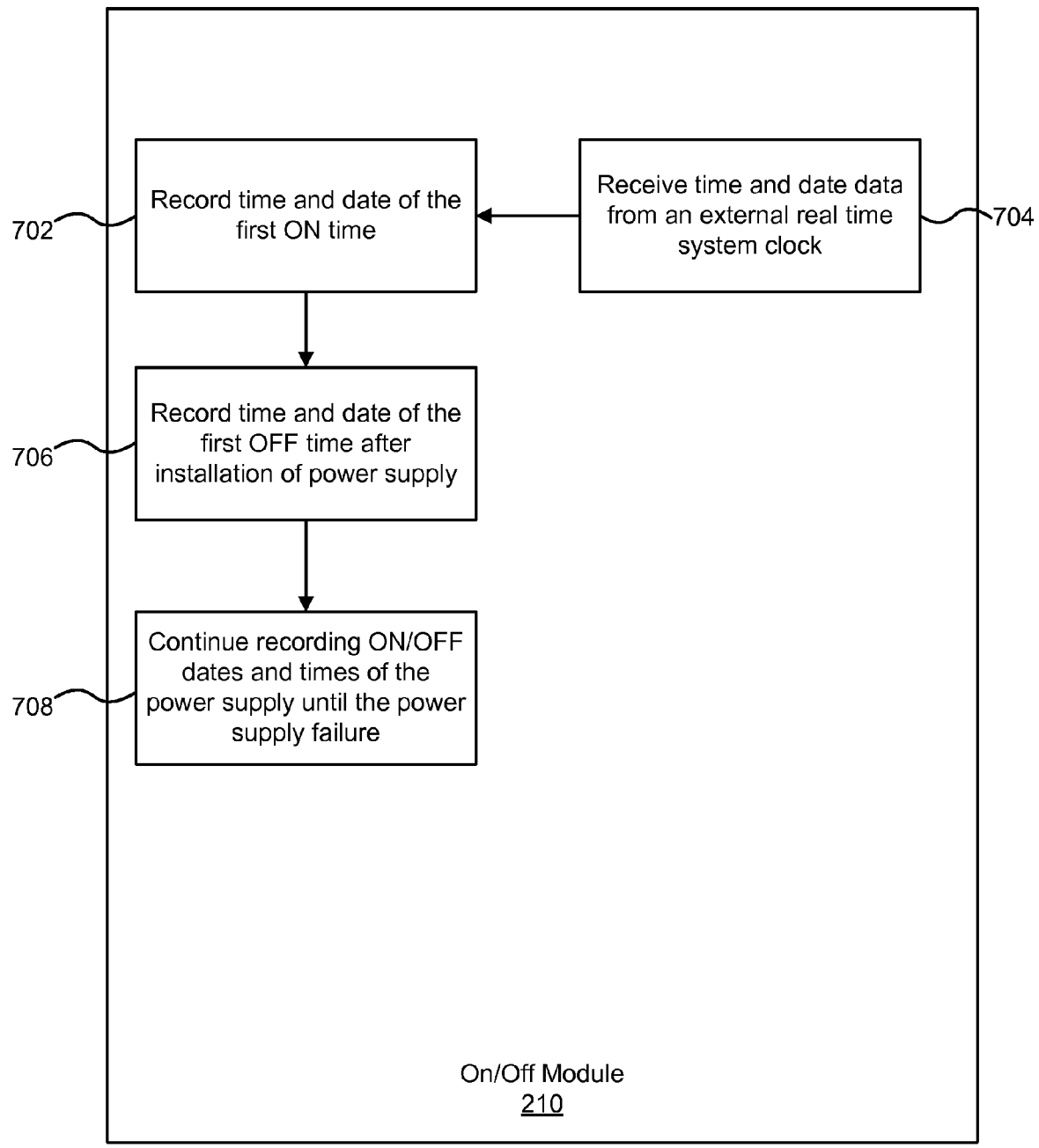
FIG. 7 is a schematic flow chart diagram illustrating one embodiment of an on/off module to determine and store, in the solid state-storage, each date and time that the power supply is turned on and each date and time that the power supply is turned off.

FIG. 7 is a schematic flow chart diagram illustrating one embodiment of an on/off module 210 to determine and store, in the solid state-storage 108, each date and time when the power supply 102 is turned on and each date and time that the power supply 102 is turned off.

The on/off module 210 records 702 the time and date of the first ON time, or the first time the power supply 102 is turned on. Again, the time and date information is preferably received 704 from an external real time system clock. The on/off module 210 then records a time and a date of the first OFF time after installation of the power supply 102. Subsequently, the on/off module 210 continues update and record on/off dates and times of the power supply 102 until the power supply 102 fails. In one embodiment, the on/off module 210 may keep records for a predetermined number of preceding on/off cycles. For example, records for the last 50 on/off cycles may be stored in the solid-state storage 108 and continuously updated by the on/off module 210. The on/off information may be utilized by the manufacturer to determine if the frequency of turning OFF and turning ON the power supply 102 may have contributed to a failure of the power supply 102, if a failure occurred while the power supply was off, etc.

Figure 8:
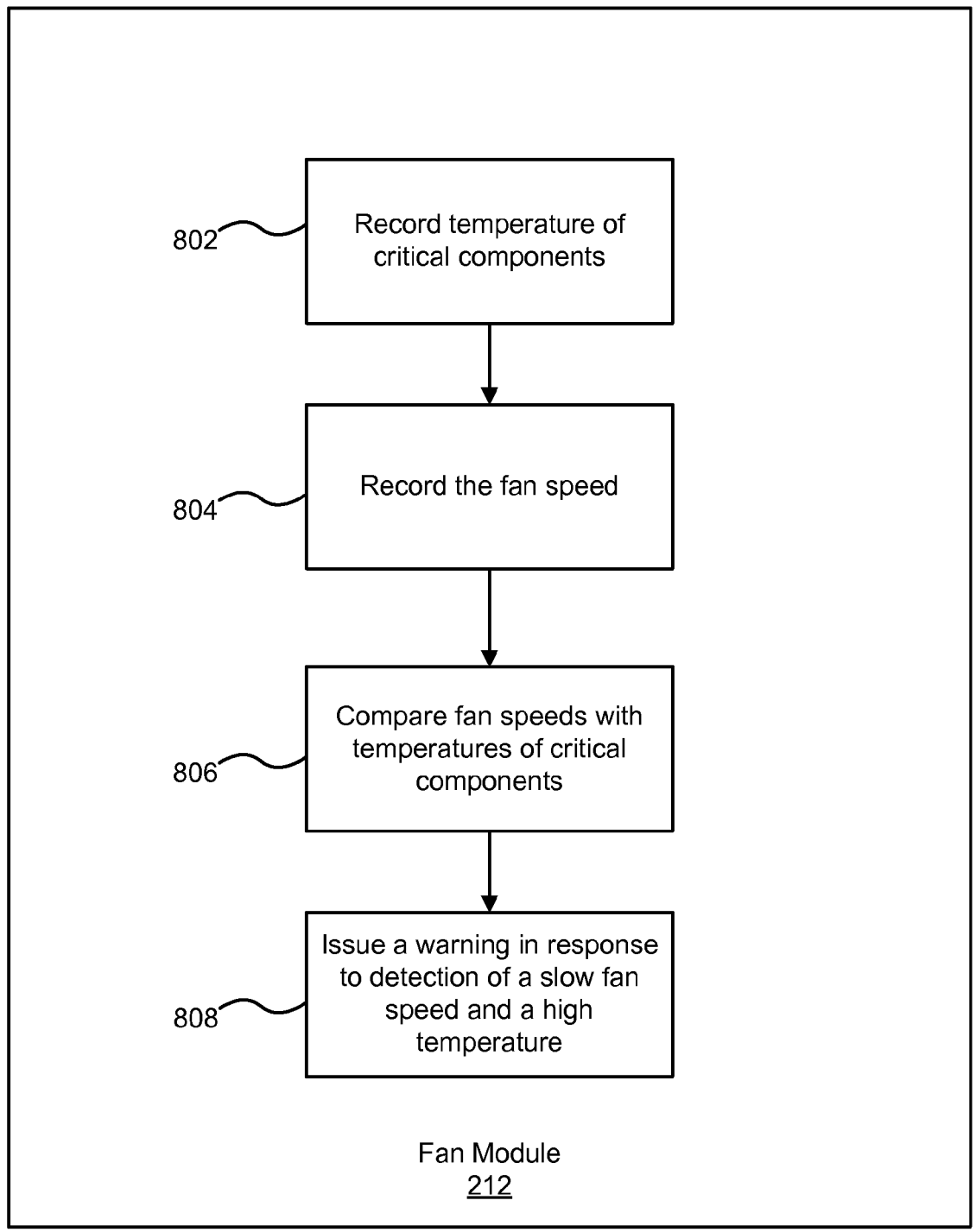
FIG. 8 is a schematic flow chart diagram illustrating one embodiment of a fan module to determine and store, in the solid state-storage, a temperature of at least one critical component of the power supply and a fan speed of a fan configured to cool the component.

FIG. 8 is a schematic flow chart diagram illustrating one embodiment of a fan module 212 to determine and store, in the solid state-storage 108, a temperature of at least one critical component of the power supply 102 and a fan speed of a fan configured to cool the component. The power supply 102 preferably includes a fan for preventing overheating of the electrical components of the power supply 102. In one embodiment, the fan may be controlled to speed up or turn on in response to a rise in the temperature of a critical component of the power supply 102, or to slow down or turn off in response to the temperature of the critical component falling below a threshold. The fan module 212 issues a warning in response to determining the temperature of a critical component is above a predetermined threshold. The fan module 212 records a fan speed at the same time. The data may be used to determine if fan speed contributed to failure of the component.

In one embodiment, the fan module 212 issues a warning in response to determining that the temperature of a critical component is above a predetermined threshold and that the fan speed remains below a predetermined threshold. This condition may indicate that the fan is about to fail or is having some other problem that may prevent the fan from properly cooling component as described below.

Referring to FIG. 8, the fan module 212 records 802 the temperature of one or more critical components. Then the fan module 212 records the fan speed of at least one fan provided to cool the critical components. In one embodiment, the recorded temperatures and fan speeds are stored in the solid-state storage 108 for later use. Next, the fan module 212 compares 806 one or more of the recorded fan speeds with one or more of the recorded temperatures, and issues 808 a warning in response to the detection of fan speed below a predetermined threshold (slow fan speed) and a temperature above a predetermined threshold (high temperature). Thus, if the components are getting too hot, and the fan is not sufficiently cooling the critical components (perhaps due to a fan malfunction or the component being heated beyond the fan's capacity to cool), then fan module issues a warning that may indicate an imminent failure of the power supply 102.

Figure 9:
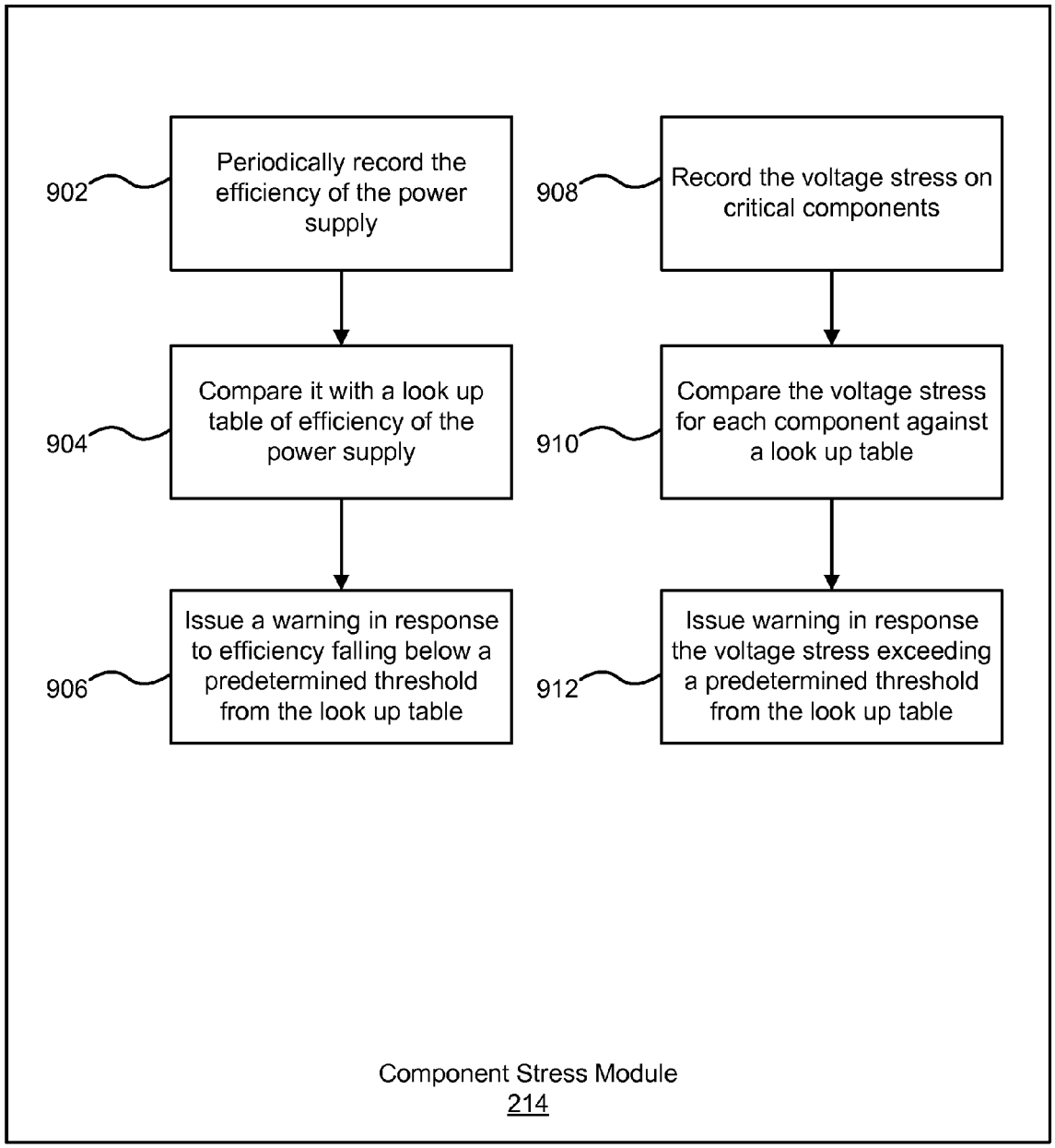
FIG. 9 is a schematic flow chart diagram illustrating one embodiment of component stress module to measure a voltage on one or more critical components, compare the voltage against a voltage threshold in a voltage stress lookup table, and output a warning in response to the voltage exceeding the voltage threshold from the voltage stress lookup table.

FIG. 9 is a schematic flow chart diagram illustrating one embodiment of component stress module 214 to measure a voltage on one or more critical components, compare the voltage against a voltage threshold in a voltage stress lookup table, and output a warning in response to the voltage exceeding the voltage threshold from the voltage stress lookup table. One cause of failure of a component may be that the component has been exposed to a voltage that will cause damage to the component. For example, a component may be rated to withstand 400 volts ("V"). A 450 V power surge may stress the component and cause subsequent failure. The component stress module 214 measures voltage across a component and records the voltage if it exceeds a maximum voltage rating of the component. The component stress module 214, in one embodiment, uses a maximum voltage rating found in a lookup table to determine if the voltage measured across the component exceeds this maximum rating. The voltage data may be used to determine if the component was exposed to a high voltage that may have contributed to or caused a failure of the component The component stress module 214 may be used by the manufacturer of the power supply 102 to show that a high voltage, which may be caused by something external to the power supply 102, caused a component failure.

In one embodiment, the component stress module 214 periodically records 902 the efficiency of the power supply 102. This may done in accordance with the efficiency module 202 depicted in FIG. 3. The component stress module 214 then compares 904 the recorded efficiencies with a look up table predefined efficiencies in the solid-state storage 108. If the efficiency falls below a predetermined threshold defined by the look up table, the component stress module 214 may detect that one or more critical components has degraded thereby causing a decrease in efficiency, and may issue 906 a warning.

In a further embodiment, the component stress module 214 records 908 the voltage stress on at least one critical component in the power supply 102 by measuring a voltage across the component. Then the component stress module 214 compares 910 the recorded voltage stress against a look up table for each component and issues 912 a warning in response to the voltage stress exceeding a predetermined threshold defined by the look up table. Such a warning may indicate to the system that the voltage stress is too high may cause a failure in the power supply 102.

Figure 10:
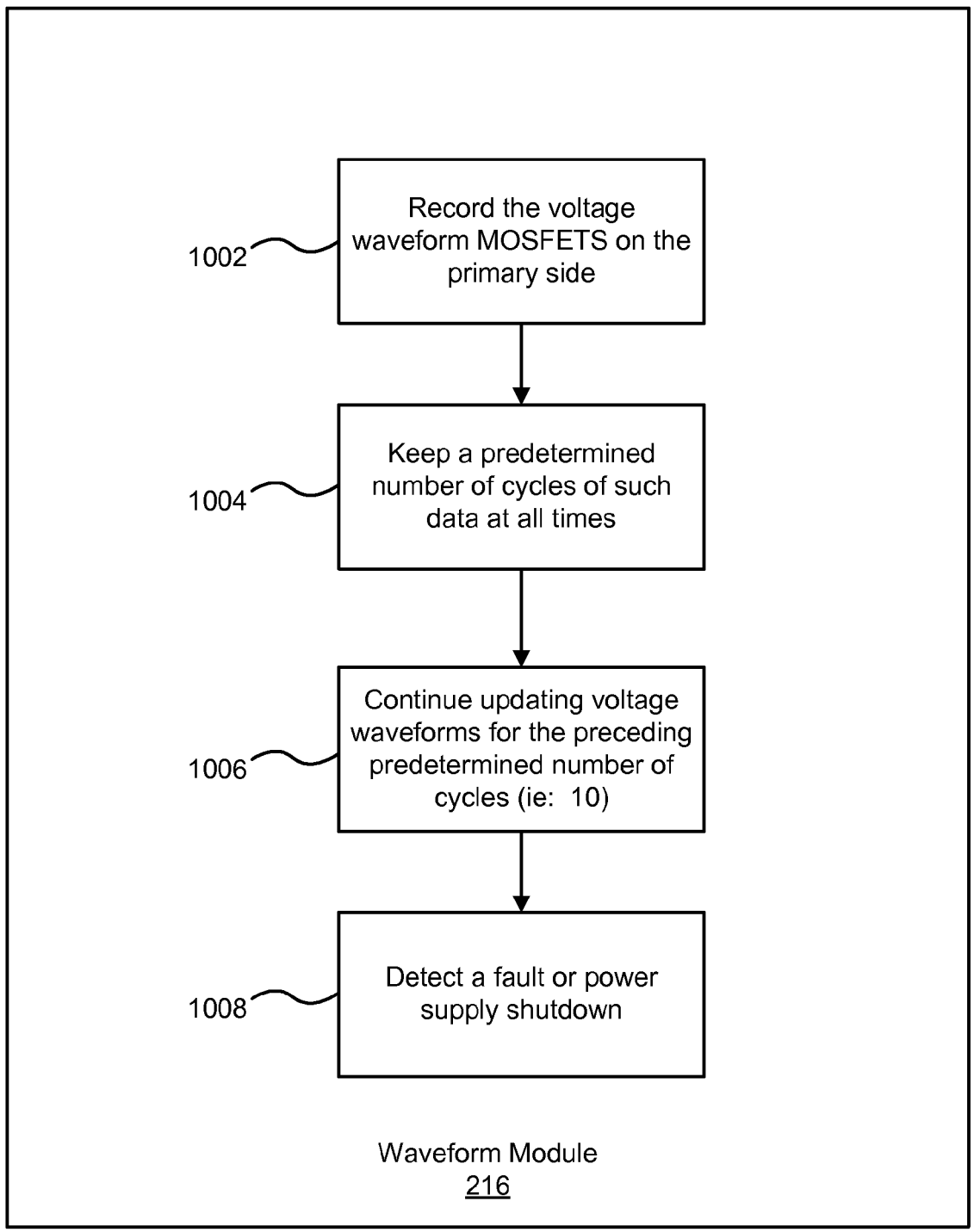
FIG. 10 is a schematic flow chart diagram illustrating one embodiment of a waveform module to continuously record and update, in the solid state-storage, a predetermined number of cycles of a voltage waveform for one or more MOSFETs in the power supply, a cycle comprising one period of a switching rate for the power supply.
Figure 11:
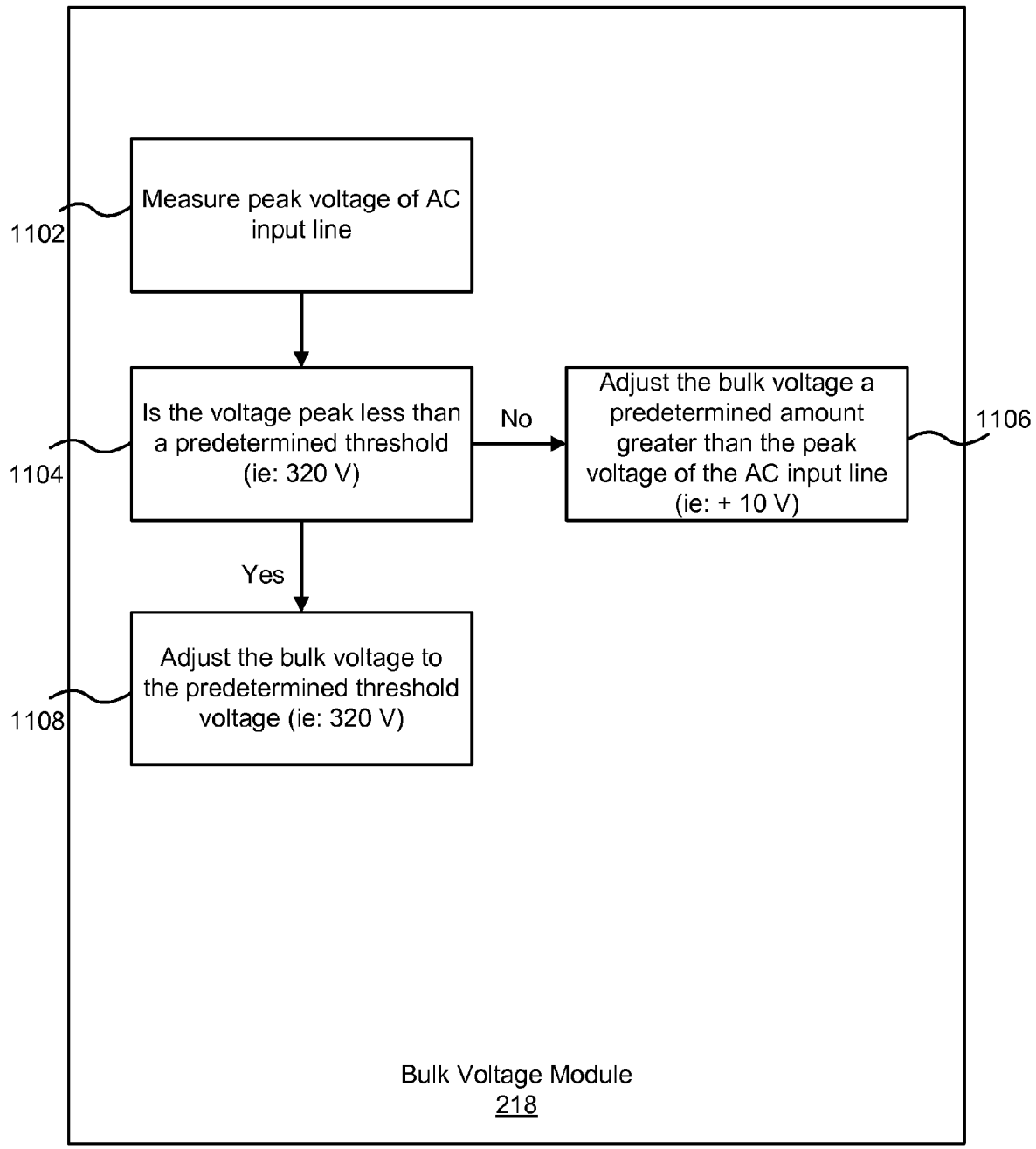
FIG. 11 is a schematic flow chart diagram illustrating one embodiment of a bulk voltage module autonomically adjust a bulk voltage of the power supply in response to a peak AC input voltage exceeding a predetermined threshold, the bulk voltage comprising a output of a first power supply stage and used as an input of a second power supply stage.
Figure 12:
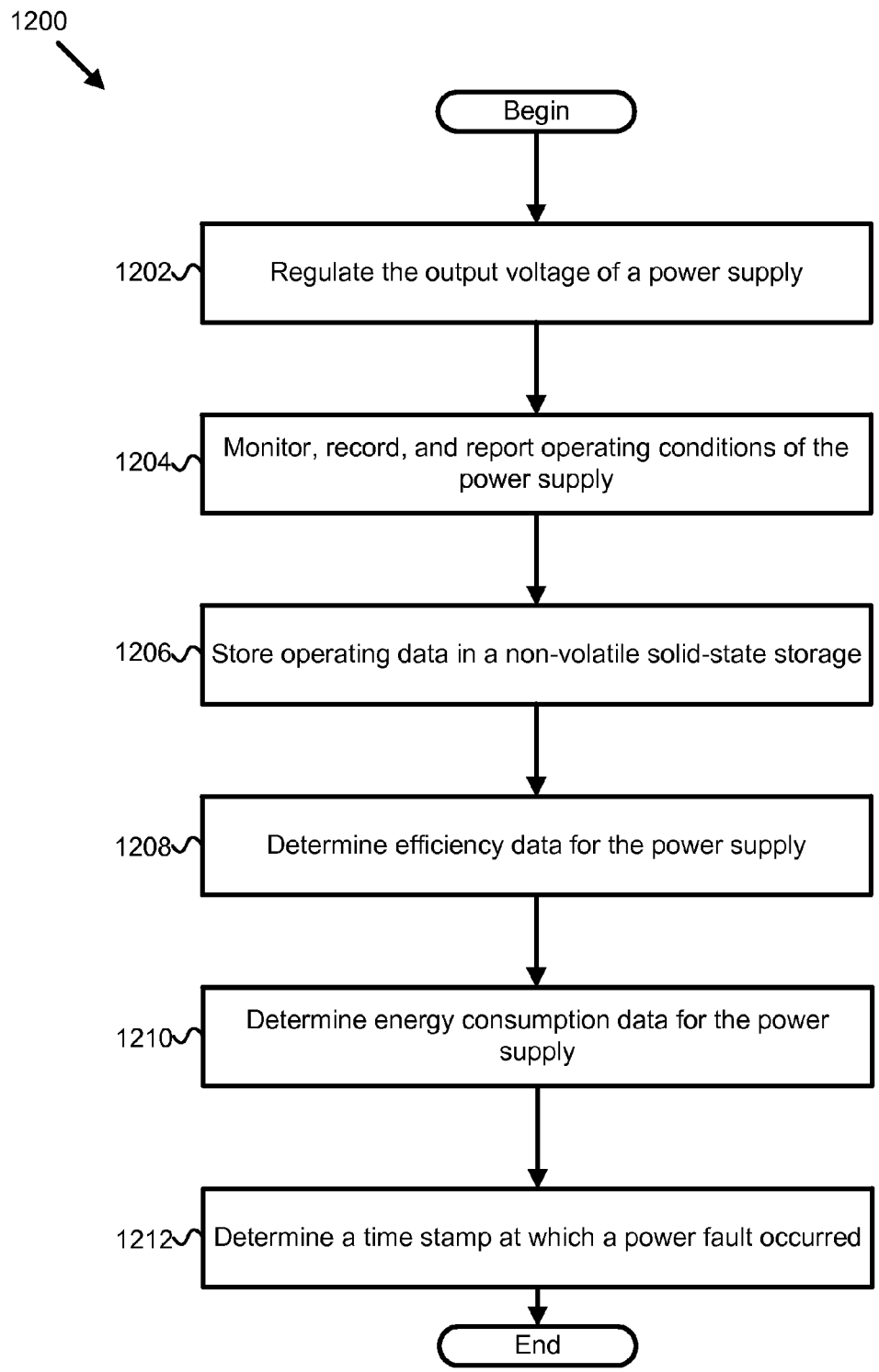
FIG. 12 is a schematic flow chart diagram illustrating one embodiment of a method for event, time, and failure state recording in a power supply.

FIG. 10 is a schematic flow chart diagram illustrating one embodiment of a waveform module 216 that continuously records and updates, in the solid state-storage 108, a predetermined number of cycles of a voltage waveform for one or more metal-oxide-semiconductor field-effect transistor ("MOSFETs") in the power supply 102. Typically, a power supply 102 is switched at a particular rate, such as 10 kilohertz ("kHZ"). A cycle comprises one period of the switching rate for the power supply 102.

The waveform module 216 first records 1002 the voltage waveform for one or more MOSFETS in the power supply 102. In one embodiment, a predetermined number of voltage waveforms corresponding to a predetermined number of cycles are continuously stored 1004 and updated 1006 in the solid-state storage 108 such that, in the event of a fault, the voltage waveforms for a certain number of cycles preceding the fault are available for analysis. Finally, the waveform module 216 detects 1008 a fault or power supply shutdown and ensures that the waveform data is preserved in the solid-state storage 108. The waveform information may be used by the manufacturer or system user to diagnose what may have caused a failure in the power supply 102 or predict an imminent failure in the power supply 102.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a power supply that receives alternating current ("AC") voltage as an input and provides regulated direct current ("DC") voltage as an output;
   a microcontroller integrated into the power supply that regulates output voltage and monitors, records, and reports operating conditions of the power supply and that records a fault code for the power supply, wherein the fault code is generated by at least one of the power supply and an electronic device connected to the power supply in response to a fault; and
   a non-volatile solid-state storage that can be repeatedly read from, written to, and erased by the microcontroller and integrated within the microcontroller such that only a single address is needed to access both the microcontroller and the solid-state storage, the solid-state storage configured to store operating data and the fault codes received from the microcontroller, the operating data comprising recorded operating conditions of the power supply.

2. The apparatus of claim 1, wherein the non-volatile solid-state storage is an electrically erasable programmable read-only memory ("EEPROM").

3. The apparatus of claim 2, wherein the EEPROM is a flash memory.

4. The apparatus of claim 1, further comprising an efficiency module configured to periodically determine and store, in the solid state-storage, efficiency data for the power supply, the efficiency data comprising data indicating an amount of power loss within the power supply.

5. The apparatus of claim 3, wherein the efficiency module is further configured to compare the efficiency data stored in the solid-state storage with a lookup efficiency table and output a prediction failure warning in response to the power supply efficiency falling below a predefined threshold.

6. The apparatus of claim 1, further comprising an energy module configured to periodically determine and store, in the solid state-storage, energy consumption data for the power supply, the energy consumption data comprising data indicating an amount of energy consumed by the power supply.

7. The apparatus of claim 1, further comprising a time module configured to determine and store, in the solid state-storage, a time stamp indicating a time and a date at which a power fault occurred, the time and data information received from a system clock external to the power supply.

8. The apparatus of claim 1, further comprising a power on hours ("POH") module configured to determine and store, in the solid state-storage, a number of hours during which the power supply has been operating.

9. The apparatus of claim 1, further comprising an on/off module configured to determine and store, in the solid state-storage, each date and time that the power supply is turned on and each date and time that the power supply is turned off.

10. The apparatus of claim 1, further comprising a fan module configured to determine and store, in the solid state-storage, a temperature of at least one critical component of the power supply and a fan speed of a fan configured to cool the component.

11. The apparatus of claim 10, wherein the fan module is further configured to output a failure prediction warning in response to detection of a temperature above a predefined threshold and a fan speed below a predefined threshold.

12. The apparatus of claim 1, further comprising a component stress module configured to measure a voltage on one or more critical components, compare the voltage against a voltage threshold in a voltage stress lookup table, and output a warning in response to the voltage exceeding the voltage threshold from the voltage stress lookup table.

13. The apparatus of claim 1, further comprising a waveform module configured to continuously record and update, in the solid state-storage, a predetermined number of cycles of a voltage waveform for one or more metal-oxide-semiconductor field-effect transistors ("MOSFETs") in the power supply, a cycle comprising one period of a switching rate for the power supply.

14. The apparatus of claim 13, wherein the recorded and updated voltage waveforms comprise a predetermined number of voltage waveforms immediately preceding a failure event.

15. The apparatus of claim 1, further comprising a bulk voltage module configured to adjust a bulk voltage of the power supply in response to a peak AC input voltage exceeding a predetermined threshold, the bulk voltage comprising an output of a first power supply stage and used as an input of a second power supply stage.

16. The apparatus of claim 15, wherein the bulk voltage module is further configured to adjust a set point of the first power supply stage, the set point comprising a voltage to which the first power supply stage regulates the bulk voltage.

17. A computer program product comprising a non-transitory computer readable medium having computer usable program code stored on a tangible medium and executable on a processor, the operations of the computer program product comprising:
   regulating the output voltage of a power supply and monitoring, recording, and reporting operating conditions of the power supply and recording fault codes for the power supply via a microcontroller integrated into the power supply, wherein the fault code is generated by at least one of the power supply and an electronic device connected to the power supply in response to a fault the power supply receiving alternating current ("AC") voltage as an input and providing regulated direct current ("DC") voltage as an output; and storing operating data and fault codes in a non-volatile solid-state storage that can be repeatedly read from, written to, and erased by the microcontroller, the solid-state storage integrated within the microcontroller such that only a single address is needed to access both the microcontroller and the solid-state storage, the solid-state storage configured to store operating data received from the microcontroller, the operating data comprising the recorded operating conditions of the power supply.

18. The computer program product of claim 17, wherein the non-volatile solid-state storage is an electrically erasable programmable read-only memory ("EEPROM").

19. The computer program product of claim 18, wherein the EEPROM is a flash memory.

20. The computer program product of claim 17, further comprising periodically determining and storing, in the solid state-storage, efficiency data for the power supply, the efficiency data comprising data indicating an amount of power loss within the power supply.

21. The computer program product of claim 20, further comprising comparing the efficiency data stored in the solid-state storage with a lookup efficiency table and outputting a prediction failure warning in response to the power supply efficiency falling below a predefined threshold.

22. The computer program product of claim 17, further comprising periodically determining and storing, in the solid state-storage, energy consumption data for the power supply, the energy consumption data comprising data indicating an amount of energy consumed by the power supply.

23. The computer program product of claim 17, further comprising determining and storing, in the solid state-storage, a time stamp indicating a time and a date at which a power fault occurred, the time and data information received from a system clock external to the power supply.

24. A system comprising:
  a power supply that receives alternating current ("AC") voltage as an input and provides regulated direct current ("DC") voltage as an output;
  an electronic device that receives the regulated DC voltage as an input;
  a microcontroller integrated into the power supply that regulates output voltage and monitors, records, and reports operating conditions of the power supply and that records fault codes for the power supply, wherein the fault code is generated by at least one of the power supply and the electronic device in response to a fault; and
  a non-volatile solid-state storage that can be repeatedly read from, written to, and erased by the microcontroller and integrated within the microcontroller such that only a single address is needed to access both the microcontroller and the solid-state storage, the solid-state storage configured to store operating data and fault codes received from the microcontroller, the operating data comprising recorded operating conditions of the power supply.

25. An apparatus comprising:
  a power supply that receives alternating current ("AC") voltage as an input and provides regulated direct current ("DC") voltage as an output;
  a microcontroller integrated into the power supply that regulates output voltage and monitors, records, and reports operating conditions of the power supply;
  a non-volatile solid-state storage that can be repeatedly read from, written to, and erased by the microcontroller and integrated within the microcontroller such that only a single address is needed to access both the microcontroller and the solid-state storage, the solid-state storage configured to store operating data received from the microcontroller, the operating data comprising recorded operating conditions of the power supply;
  an efficiency module configured to periodically determine and store, in the solid state-storage, efficiency data for the power supply, the efficiency data comprising data indicating an amount of power loss within the power supply wherein the efficiency module is further configured to compare the efficiency data stored in the solid-state storage with a lookup efficiency table and output a prediction failure warning in response to the power supply efficiency falling below a predefined threshold;
  an energy module configured to periodically determine and store, in the solid state-storage, energy consumption data for the power supply, the energy consumption data comprising data indicating an amount of energy consumed by the power supply;
  a time module configured to determine and store, in the solid state-storage, a time stamp indicating a time and a date at which a power fault occurred, the time and data information received from a system clock external to the power supply;
  a power on hours ("POH") module configured to determine and store, in the solid state-storage, a number of hours during which the power supply has been operating;
  an on/off module configured to determine and store, in the solid state-storage, each date and time that the power supply is turned on and each date and time that the power supply is turned off;
  a fan module configured to determine and store, in the solid state-storage, a temperature of at least one critical component of the power supply and a fan speed of a fan configured to cool the component wherein the fan module is further configured to output a failure prediction warning in response to detection of a temperature above a predefined threshold and a fan speed below a predefined threshold;
  further comprising a component stress module configured to measure a voltage on one or more critical components, compare the voltage against a voltage threshold in a voltage stress lookup table, and output a warning in response to the voltage exceeding the voltage threshold from the voltage stress lookup table;
  a waveform module configured to continuously record and update, in the solid state-storage, a predetermined number of cycles of a voltage waveform for one or more metal-oxide-semiconductor field-effect transistors ("MOSFETs") in the power supply, a cycle comprising one period of a switching rate for the power supply wherein the recorded and updated voltage waveforms comprise a predetermined number of voltage waveforms immediately preceding a failure event; and
  a bulk voltage module configured to autonomically adjust a bulk voltage of the power supply in response to a peak AC input voltage exceeding a predetermined threshold, the bulk voltage comprising an output of a first power supply stage and used as an input of a second power supply stage wherein the bulk voltage module is further configured to adjust a set point of the first power supply stage, the set point comprising a voltage to which the first power supply stage regulates the bulk voltage.

* * * * *